(12) United States Patent
Sotgiu

(10) Patent No.: US 9,038,692 B2
(45) Date of Patent: May 26, 2015

(54) WHEEL-CLAMPING DEVICE FOR A WHEEL-SERVICE-MACHINE AND METHOD FOR REVERSIBLY CLAMPING A WHEEL ON A WHEEL-CLAMPING DEVICE FOR A WHEEL-SERVICE-MACHINE

(71) Applicant: SNAP-ON EQUIPMENT SRL A UNICO SOCIO, Correggio (RE) (IT)

(72) Inventor: Paolo Sotgiu, Modena (IT)

(73) Assignee: SNAP-ON EQUIPMENT SRL A UNICO SOCIO, Cerreggio (RE) (IT)

( * ) Notice: Subject to any disclaimer, the term of this patent is extended or adjusted under 35 U.S.C. 154(b) by 243 days.

(21) Appl. No.: 13/852,954

(22) Filed: Mar. 28, 2013

(65) Prior Publication Data

US 2013/0233495 A1 Sep. 12, 2013

Related U.S. Application Data

(63) Continuation-in-part of application No. 13/564,555, filed on Aug. 1, 2012, now abandoned.

(30) Foreign Application Priority Data

Mar. 12, 2012 (EP) .................................... 12159055

(51) Int. Cl.
*B60C 25/00* (2006.01)
*B23Q 1/70* (2006.01)
*B60C 25/05* (2006.01)

(52) U.S. Cl.
CPC . *B60C 25/00* (2013.01); *B23Q 1/70* (2013.01); *B60C 25/0542* (2013.01)

(58) Field of Classification Search
CPC .................................. B60C 25/00; B23Q 1/70
USPC ........................................ 157/14, 20; 29/559
See application file for complete search history.

(56) References Cited

U.S. PATENT DOCUMENTS

| 5,244,029 A | 9/1993 | Schoen et al. |
| 5,615,574 A | 4/1997 | Drechsler et al. |
| 7,293,595 B2 | 11/2007 | Gonzaga |
| 2012/0055636 A1 | 3/2012 | Bonacini et al. |

FOREIGN PATENT DOCUMENTS

| EP | 0836086 A2 | 4/1998 |
| EP | 1157861 A2 | 11/2001 |
| EP | 2110270 A1 | 10/2009 |
| EP | 2425993 A1 | 3/2012 |

OTHER PUBLICATIONS

European Search Report issued in European Patent Application No. 12159055.8 dated Jun. 12, 2012.
U.S. Office Action issued in U.S. Appl. No. 13/564,555 dated Jun. 11, 2014.

*Primary Examiner* — David B Thomas
(74) *Attorney, Agent, or Firm* — McDermott Will & Emery LLP

(57) ABSTRACT

The present invention concerns a wheel-clamping device for wheels on wheel-service-machines with only one drive unit and further a method for clamping wheels on a wheel-clamping device of wheel-service-machines with only one drive unit. The innovative wheel-clamping device for a wheel-service-machine according to the present invention comprises a frame 20 having a through-opening 22, and a spindle 30 being rotatably supported in the through-opening 22. Further, the spindle 30 has a through-hole 32 with a mounting-side end 30b and a driving-side end 30a, which is connectable to a drive means which is provided for a rotary movement for the spindle 30, wherein the spindle 30 has an external thread 34 on an external circumferential portion. Moreover, the wheel-clamping device comprises a sleeve 50 with a turntable 58 for the wheel to be clamped, wherein the sleeve 50 has an internal thread portion 52 which is in threaded engagement with the external thread-portion 34 of the spindle 30. Furthermore, a stopping or holding means 70 is able to temporarily hold the sleeve 50, and a clamping means 60 for the temporarily fixation of a fixing element 40 which is inserted through the mounting-side end 30b, to the spindle 30 is also provided in the innovative wheel-clamping device.

15 Claims, 7 Drawing Sheets

Detailled View A

WHEEL-CLAMPING DEVICE FOR A WHEEL-SERVICE-MACHINE AND METHOD FOR REVERSIBLY CLAMPING A WHEEL ON A WHEEL-CLAMPING DEVICE FOR A WHEEL-SERVICE-MACHINE

The present invention concerns a wheel-clamping device for wheels on turntables of wheel-service-machines with only one drive unit, and further a method for clamping wheels on a wheel-clamping device of wheel-service-machines with only one drive unit.

A wheel-mounting-device to which a rim of a motor vehicle wheel can be fixed is known from EP patent 2 110 270. The rim can be rigidly connected to the wheel mounting device. Further, the rim can be centered onto a center axis of a wheel fixing means.

It is further known from U.S. Pat. No. 5,244,029 to use a cone for the securing and centering of a motor vehicle wheel on a resting flange. Said cone is screwed manually about a hollow externally threaded securing shaft, protruding above the flange the wheel is placed onto.

In the known devices and methods described shortly above, a rim of a tyre can be fixed on a turntable by an additional actuator device. Said additional actuator device can for example be driven by a pneumatic actuator, a hydraulic actuator, an electric motor, a combustion engine or the like. The additional actuator device makes a wheel-service-machine more expensive, and further the use of additional actuators bears an increased risk of machine failure. Moreover, even an additional actuator driven manually by a hand force of the user can be used. The mounting of the wheel to be serviced onto the wheel-service-machine done manually by hand can be supported by means of levers or the like, for example by inserting a cone through a center hole of the rim and further into a threaded engagement with the turntable. The usage of a manual actuator for adjustment of the rim onto a turntable does not bear any increased risk of machine failure, but the procedure of adjusting is more time consuming than an automated procedure. Further, the mounting of the wheel onto the wheel-service-machine by hand is not user-friendly, especially when a large amount of wheels has to be serviced, which means mounted, balanced or the like.

Therefore, the object of the present invention is to overcome the drawbacks of the known art by providing a wheel-clamping device for a wheel-service-machine being able to quickly clamp a rim on a wheel-service-machine with only one drive unit, and without the need for additional actuating means.

In the case of the apparatus, the drawbacks of the known art are overcome by the features of claim 1.

The innovative wheel-clamping device for a wheel-service-machine according to the present invention comprises a frame having a through-hole, and a spindle being rotatably supported in the through-hole of the frame. Further, the spindle has a mounting-side end being provided with an opening, and a driving-side end. The spindle is connectable at its driving-side end to a drive means which is provided for a rotary movement for the spindle, wherein the spindle has an external thread on an external circumferential portion. Moreover, the wheel-clamping device comprises a sleeve with a turntable for the wheel to be temporarily clamped, wherein the sleeve has an internal thread portion which is in threaded engagement with the external thread-portion of the spindle. Furthermore, stopping/holding means are able to at least temporarily hold the sleeve, and clamping means for temporarily fixing a fixing element to the spindle are provided, wherein the fixing element is inserted into the mounting-side opening of the spindle.

The drive means, which is provided for a rotary movement for the spindle, can rotate the spindle in a first rotating direction, as well as in a second rotating direction. Moreover, by means of the threaded engagement of spindle and sleeve, the spindle is able to rotate the sleeve in the first rotating direction, as well as in the second rotating direction. Furthermore, the innovative wheel-clamping device can be used as a self-centering and blocking device.

In an embodiment of the present invention, the frame is cylindrical, and the sleeve is rotatably supported on the frame via a bearing.

In another embodiment, the sleeve has a turntable part and a thread part, wherein the turntable part is adapted to be movable in its axial direction. The turntable can be located adjacent to the turntable part. Furthermore, the turntable part describing a portion of the sleeve being movable in axial direction, can be adapted to support the turntable.

In another embodiment of the present invention, the stopping/holding means can comprise a nut-profile. Furthermore, the nut-profile can comprise an unlocking-ramp and a locking-ramp.

The nut-profile can be provided on the sleeve in a circumferential direction. The nut-profile may have a one piece configuration with the sleeve, or may be fixed onto the outer circumference of the sleeve. This possible fixation of the nut-profile on the outer circumference of the sleeve may be performed either by press fitting the nut-profile onto the sleeve, or by fixation means like screws, bolts or the like. The nut-profile can provide different nut-segments wherein the nut-segments are provided in circumferential direction on the nut-profile. The nut-segments generally have the shape of an edge wherein one nut-segment comprises at least one locking-ramp and at least one unlocking-ramp. The locking-ramp and the unlocking-ramp may be circumferentially divided from each other by a radial protrusion. The nut-profile can be provided in polygon shape having a plurality of nut-segments or edges, respectively, or may show a configuration with one nut-segment.

The ramps, which can be provided on the nut-profile may be in shape of a linear rising or linear decreasing ramp in a direction following the circumference of the sleeve the nut-profile is provided onto. Furthermore, the ramps can have a non-linear progression. The unlocking-ramp and the locking-ramp generally show different gradients. Furthermore, it is possible that the gradient of the unlocking-ramp—which can be linear or non-linear—is stronger than the gradient of the locking-ramp. The gradient of the locking-ramp can also be linear or non-linear.

In a further embodiment of the present invention, at least one cursor may be provided, wherein the at least one cursor is adapted to engage a nut-profile of the stopping/holding means. The cursor can be rotationally fixed.

The engagement of the cursor with the nut-profile may be by a frictional connection, a positive-fit connection as well as any other possible connection. Preferably, the engagement of nut-profile and stopping/holding means is easily detachable. It is also possible that two or more cursors are provided being able to engage the nut-profile. Furthermore, the at least two cursors may be provided on the same radial position, or at different radial positions confronting the nut-profile.

Furthermore, the at least one cursor can be hold by a holder. The holder can be supported by the frame as well as a basement, the frame is supported onto. By means of the holder, the rotationally fixation of the cursor may be provided. The at least one cursor which can be in engagement with the nut-profile, can be spring loaded. Preferably, the spring load is directed in the direction of the possible engagement with the nut-profile. Therewith, the spring load can support the process of establishing a frictional connection between at least one spring loaded cursor and the nut-profile.

Preferably, the cursor is moveable in a direction which is at least approximately parallel to a middle axis of the innovative wheel-clamping device. This movement being at least approximately parallel to the middle axis may be performed by a linear actuator of any possible kind, for example a hydraulically or pneumatically driven cylinder or an electrical linear motor. Also a stepper motor is possible.

Furthermore, a portion of the cursor which is adapted to come in contact with the nut-profile and engages the nut-profile may be geometrically adapted or customized such that the geometrical form of the engaging cursor portion corresponds to the ramps, the portion of the cursor comes in contact.

In another embodiment of the present invention, the stopping/holding means can comprise at least one clutch pack. Further, the at least one clutch pack can be hold by a holder. The holder which is s part of the stopping/holding means can preferably be supported by an arm being pivotally connected to the frame. Furthermore, the holder itself can be actuated for example by pneumatic actuators, by hydraulic actuators, by magnetic or solenoid actuated means, by hand force, or by any other actuating principle that enables the holder to hold the at least one clutch pack. The clutch pack can consist for example of a first clutch and a second clutch, but can also comprise more clutches. The first and the second clutches can be provided symmetrically around the sleeve, but can also be provided solely on one side of the sleeve.

Moreover, also more than one clutch pack, in particular two or more clutch packs, can be provided with the inventive wheel-clamping device. Thereby, with a variety of clutches working in different rotating directions, the frictional force that the variety of clutches is able to apply may be increased.

The stopping/holding means are adapted to apply a first amount of frictional forces onto the sleeve while rotating in a first rotating direction, and the stopping/holding means are adapted to apply a second amount of frictional forces onto the sleeve while rotating in a second rotating direction, and wherein the second amount of frictional forces is greater than the first amount of frictional forces.

In an embodiment of the present invention, the sleeve is connectable to the frame via the stopping/holding means, and the stopping/holding means is adapted to be actuated by an actuator means. The actuator means may comprise at least one actuator spring or at least one fluid driven actuator or at least one mechanical or electrical driven actuator as well as any possible combination thereof.

In another embodiment of the present invention, the clamping means is adapted to be actuated by a movement of the sleeve. Said movement may be a linear movement of the sleeve along the middle axis of the spindle.

This actuation can be performed by a recess cut in the inner surface of the sleeve. The recess cut in the sleeve is preferably such that it extends in circumferential direction, but can also be cut segment-wise in the inner surface of the sleeve. The recess cut in the sleeve can provide at least one chamfer. This at least one chamfer can be provided in radial direction between the sleeve recess and the inner surface of the sleeve on its side being adjacent to the frame. The chamfer can also be substituted by a rounded transition between the sleeve recess and the inner surface of the sleeve.

Moreover, the clamping means comprises at least one clamping claw and at least one clamping claw actuator. Furthermore, the spindle provides at least one spindle recess extending in at least an axial direction of the spindle to house the clamping means. The spindle recess can further extend in circumferential direction, and its geometrical form can comprise a notch, a curved slot or any other possible geometry adapted to house the clamping means.

Furthermore, the two clamping means can be provided and arranged to each other in a position of 180° referred to the circumferential direction of the spindle. However, also more than two clamping means can be arranged at even angular distances referred to the circumferential direction of the spindle.

In case of the method, the drawbacks of the known art can be overcome by the features of claim 10.

The method for reversibly clamping a wheel on a wheel-clamping device for a wheel-service-machine uses the wheel-clamping device for a wheel-service-machine as claimed in claim 1. Further, the method comprises that a rotation of the spindle in a first rotating direction moves the sleeve, which is temporarily rotationally held by the stopping/holding means, in a direction towards the wheel. Thereby the clamping means is actuated to let loose of the rim by the fixing element.

According to the inventive method of the present invention, it is possible to fulfill the function of clamping a wheel with the wheel-clamping device of the wheel-service-machine only by means of the main rotating force, provided by a drive means for a rotary movement, provided generally to drive wheel-service-machine itself.

In a preferred embodiment of the present invention, the spindle can rotate the sleeve in the first rotating direction and in the second rotating direction.

In another aspect of the present invention, the stopping/holding means applies a first amount of frictional forces onto the sleeve while rotating in a first rotating direction, and the stopping/holding means applies a second amount of frictional forces onto the sleeve while rotating in a second rotating direction, and wherein the second amount of frictional forces is greater than the first amount of frictional forces.

Furthermore, the clamping means is adapted to be actuated by the movement of the sleeve. Said movement may be a linear movement of the sleeve along the middle axis of the spindle.

Moreover, the clamping means comprise at least one clamping claw and at least one clamping claw actuator, and the sleeve acts on the at least one clamping claw actuator. This can be done by means of a recess cut in the sleeve, being adjacent to the clamping means.

In another preferred embodiment of the present invention, the at least one clamping claw actuator which is actuated by the movement of the sleeve, actuates the at least one clamping claw to clamp the fixing element.

In another embodiment of the present invention, the at least one clamping claw is adapted to be spring loaded by a spring, and the at least one clamping claw tends to engage a threaded rod which is a part of the fixing element, as a result of the spring load.

Based on the consideration that no external force or means is used for the clamping process of the wheel on the turntable by means of the method for reversibly clamping a wheel on a wheel-clamping device, the present invention seeks to use the rotary movement of the drive means, which in any way has to be present in wheel-service-machines, for actuating the wheel-clamping device.

Therefore, the wheel is placed onto the wheel-service-machine, in particular onto the turntable, which is in general the outermost part of the wheel-service-machine in a direction away from the main and only drive means. In case, the spindle is arranged vertically, the turntable is located generally on the uppermost part of the wheel-service-machine in the direction away from the main drive means. Further a fixing element is guided through a center hole of the wheel rim and inserted in the inner tubular opening of a drive spindle on a mounting-side end thereof, the spindle is rotationally driven by the main rotary movement of the drive means.

Said main rotary movement of the drive means can partially be transformed from a solely rotary movement into a linear movement. This partially transmission of a main rotary movement, initiated by the drive means, into a linear movement can for example be performed by a threaded engagement, by a system using centrifugal forces, produced by the rotating movement, in combination with a part like a cone where two or more transmission partners can slide on, by a system comprising a threaded engagement of two or more engagement partners, by a system using a pinion engaged in a toothed surface, or further by any arrangement of parts allowing the transmission of a rotary movement into a linear movement. In the preferred embodiment of the present invention, the partial transmission of a rotary movement into a linear movement is in general done by means of a threaded engagement of engagement partners, in particular by two engagement partners.

A first of said engagement partners is directly connected to the main rotary movement, which is provided by the drive means, and fulfills the equal main rotating movement. Its axial position referring to a center axis of the engagement partner is fixed. For fulfilling a rotary movement, the first engagement partner can be rotationally supported in a housing, a tubing, a pedestal or the like. Therewith, in a preferred embodiment of the present invention, the first engagement partner is embodied by the spindle.

A second engagement partner, being in threaded engagement with the first engagement partner is, at least for a time-period of establishing a solid connection between first and second engagement partner, rotationally fixed by the stopping/holding means, but not axially fixed. This rotation-fixation can for example be carried out by the frictional clutch, by a frictional engagement, by magnetic forces, by a spring-loaded catch or fence, or any other arrangement of parts allowing the second engagement partner to move in an axial direction and further inhibiting its rotary movement during a connection process of first and second engagement partners. Therewith, the rotary movement of the first engagement partner forces the second engagement partner to move in a direction along the center axis of the threaded engagement. The direction, in which the second engagement partner is forced to move along said center axis, can depend on the screwing-direction, which means the direction of the rotary movement, and further on the kind of thread, which can be a left-hand thread or a right-hand thread. Therewith, in a preferred embodiment of the present invention, the second engagement partner is embodied by the sleeve.

The generated linear movement of the second engagement partner can be used to clamp the rim lying on the turntable of the wheel-service-machine against a first end of the fixing element. Therefore, the second engagement partner can be moved along its center axis towards the direction of the wheel rim. Therewith, the second engagement partner presses the turntable against the rim, and the rim presses further against the first end of the fixing element. In a preferred embodiment of the present invention, the fixing element is rotationally symmetrical. The first end of the fixing element can have a conical form, a second end can comprise a rod. In case, the first end of the fixing element has a conical form, the smaller diameter of the conical form is adjacent to the second end of the fixing element. Further, the linear moving of the second engagement partner can be used to press the linearly moving second engagement partner against the rim, and the rim against the conical first end of the fixing element, being adjacent to the rod. Thereby, the conical form of the fixing element is adapted to perform a centering task onto the rim, because the conical form centers the center hole of the rim.

The linear movement of the second engagement partner can be used to actuate the clamping means. The actuation of the clamping means can for example be performed by a recess provided in a surface of the second engagement partner being adjacent to the clamping means. Said recess can be conducted circumferentially, annular, segment-wise, or in any other possible geometrical form cut in the surface of the second engagement partner being able to contact the clamping means, for example on the inside surface of the second engagement partner. Further, also a protrusion provided on the surface being able to contact the clamping means can be used to actuate the clamping means. Generally, the second engagement partner provides a geometrical feature on its surface being able to contact the clamping means, which can be used to actuate the clamping means.

The clamping means itself are located on the first engagement partner, which can be the drive spindle. Furthermore, the clamping means are located for example in notches, cut in the first engagement partner and can be extended in an axial direction of the first engagement partner itself.

Moreover, the clamping means can comprise the clamping claw actuator, which is actuated by the second engagement partner. The clamping claw actuator of the clamping means can itself be able to actuate the clamping claw means. The clamping claw means can be able to clamp the fixing element inside the tubular opening of the drive spindle. In a further embodiment of the present invention the clamping claw can comprise a pin being able to engage a pin hole cut in the fixing element. Said clamping claw means being able to clamp the fixing element can be a spring, a spring-loaded bolt or anchor, a plain clamp, a spring loaded clamp, an internal threaded circular, semicircular or segmental clip or junction, chuck jaws which can also be spring loaded, or any other arrangement which is able to clamp the fixing element inside a tubular opening. Moreover, also a clamping means can be provided, where the second engagement partner directly actuates the clamping claw means itself. With an arrangement like this, no further clamping claw actuator is needed.

The clamping means can be actuated by the second engagement partner, and are adapted to temporarily clamp the fixing element which is guided in the inside of the first engagement partner. Furthermore, the clamping means generally rotate with the rotating spindle Therefore, the notches to locate the clamping means have to have a passage from the outside surface of the spindle, to the inside surface of the spindle to enable the clamping means to be actuated by the second engagement partner on the outside surface of the spindle, and to temporarily clamp the fixing element which is located inside the spindle.

After a successfully performed clamping process between fixing element and clamping means, the clamping means, generally rotating with the rotating spindle, are connected to the fixing element. As already mentioned above, the fixing element is initially guided through a center opening of the rim into an opening of the pedestal of the wheel-service-machine. Further, the fixing element establishes the connection of the rim of the tyre to be serviced with the main driving force via the connection with the clamping means, established by the clamping process.

While the second engagement partner travels in axial direction along its center axis, caused by the rotary movement of the first engagement partner, the second engagement partner reaches a compressed contact with the wheel rim and the conical part of the fixing element. In case the second engagement partner is willing to move up further, the pressure onto the rim increases, therewith the friction force in the threaded engagement of first and second engagement partner increases, too. In case the frictional force between first and second engagement partner exceeds a predetermined force which may be a threshold, which can for example be set dependent on the material properties of the rim, the stopping/holding means, in particular the clutch pack, is forced to loose connection with the second engagement partner.

In a preferred embodiment of the present invention, this can for example be done by employment of the frictional clutch as already mentioned above. The usage of a frictional clutch provides furthermore the advantage, that no additional actuation means has to be used. In case the frictional force between first and second engagement partners exceeds the predetermined threshold force, the clutch looses the frictional contact with the second engagement partner, and the second engagement partner follows the main rotary movement of the first engagement partner.

Therewith, the travelling distance, which means the length the second engagement partner is able to move along the direction along its center axis, can depend on the maximum pressure which can be exerted on the rim, the maximum friction force in the threaded engagement together with the predetermined threshold value for the friction force in the clutch, as well as the length of the threaded engagement of first and second engagement partners.

Further, the present invention supports an apparatus for a wheel-service-machine, not demanding additional actuating forces or hand forces of the user.

A method like the one present in the invention provides the user with a fully automatic method for fixing a tyre or rim on a pedestal of a wheel-self-machine without any additional processing steps demanded from the user.

Furthermore, because of the absence of additional actuating parts, the present invention reduces a possible error rate by disclosing a failure proof system for fixing a rim or wheel on a wheel-service-machine.

With an arrangement like the one present in the present invention, the main rotary driving force can be used first for initiating the connection process of first and second engagement partners. Further, the generated linear movement of the second engagement partner enables the clamping means to clamp the fixing element. During the linear movement of the second engagement partner, the turntable is further pressed against the fixing element, which leads to a clamping and centering process of the rim being placed onto the turntable. A further advantage of the present invention is the fact, that only one rotary movement is used to initially clamp the fixing element by the clamping means in and onto the drive spindle of the rotary driving force, and the same rotary movement is set further to directly run a wheel-service-machine in its procedural run. The main rotating force can be brought to a halt between the clamping and centering process of the wheel-clamping device of the rim onto the turntable and the procedural run, but this halt is not obligatory. On the contrary, the fact that the same rotary movement can be used for the wheel-clamping as well as for the procedural run on the wheel-service-machine accelerates the process time of a wheel-service-process, for example mounting and demounting of a tyre onto the rim, wheel balancing or the like.

Other advantages and one embodiment of the present invention shall now be described with reference to the attached drawings. The terms "top", "bottom", "up", "low", "left" and "right" used when describing the embodiment, relate to the drawings orientated in such a way that the reference numerals and name of the figures can be read normally.

Figure 1:
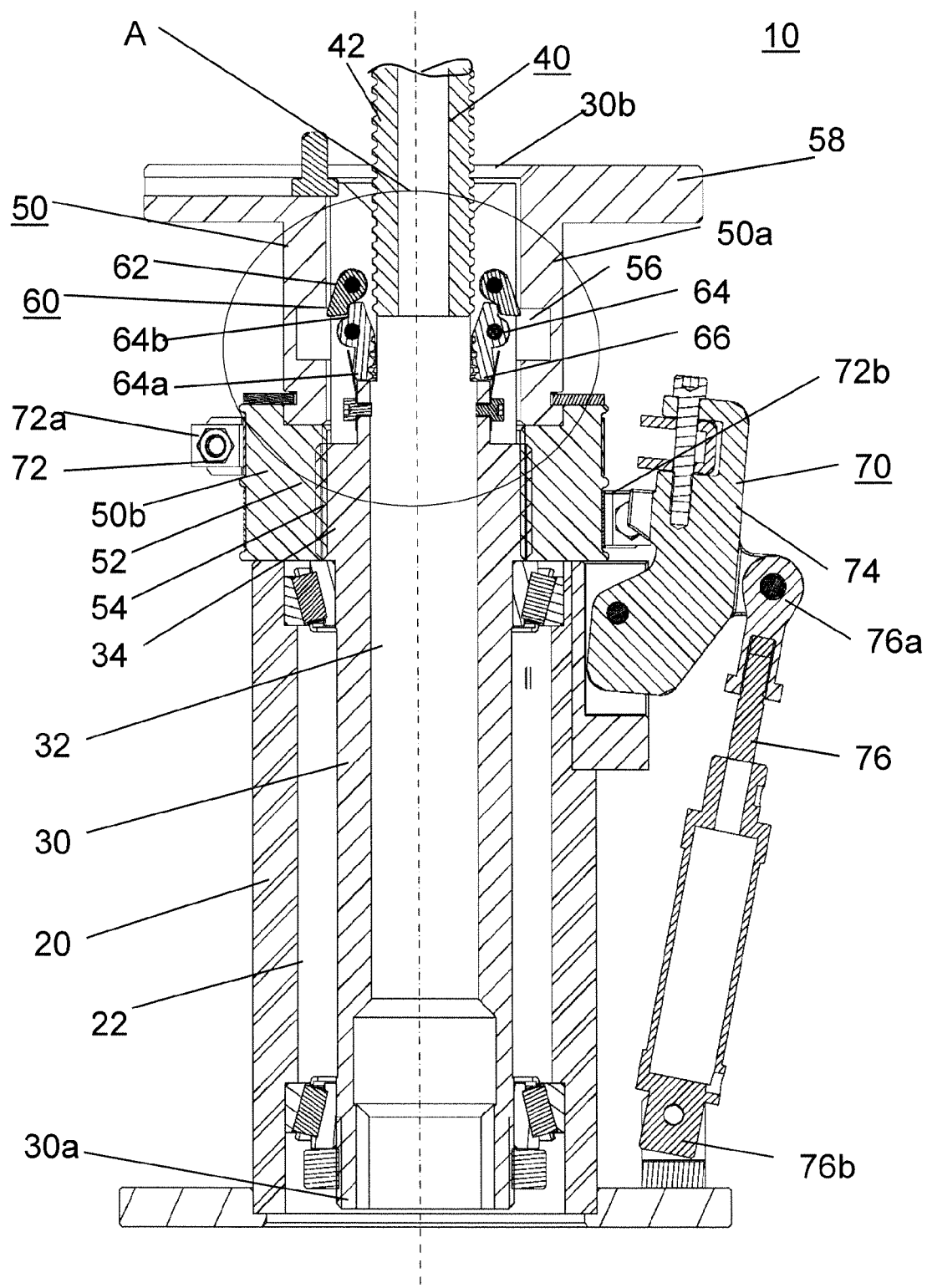
FIG. 1 shows a cross-sectional view of a first embodiment of an inventive wheel-clamping device for wheels on a turntable of a wheel-service-machine in a released state.
Figure 2:
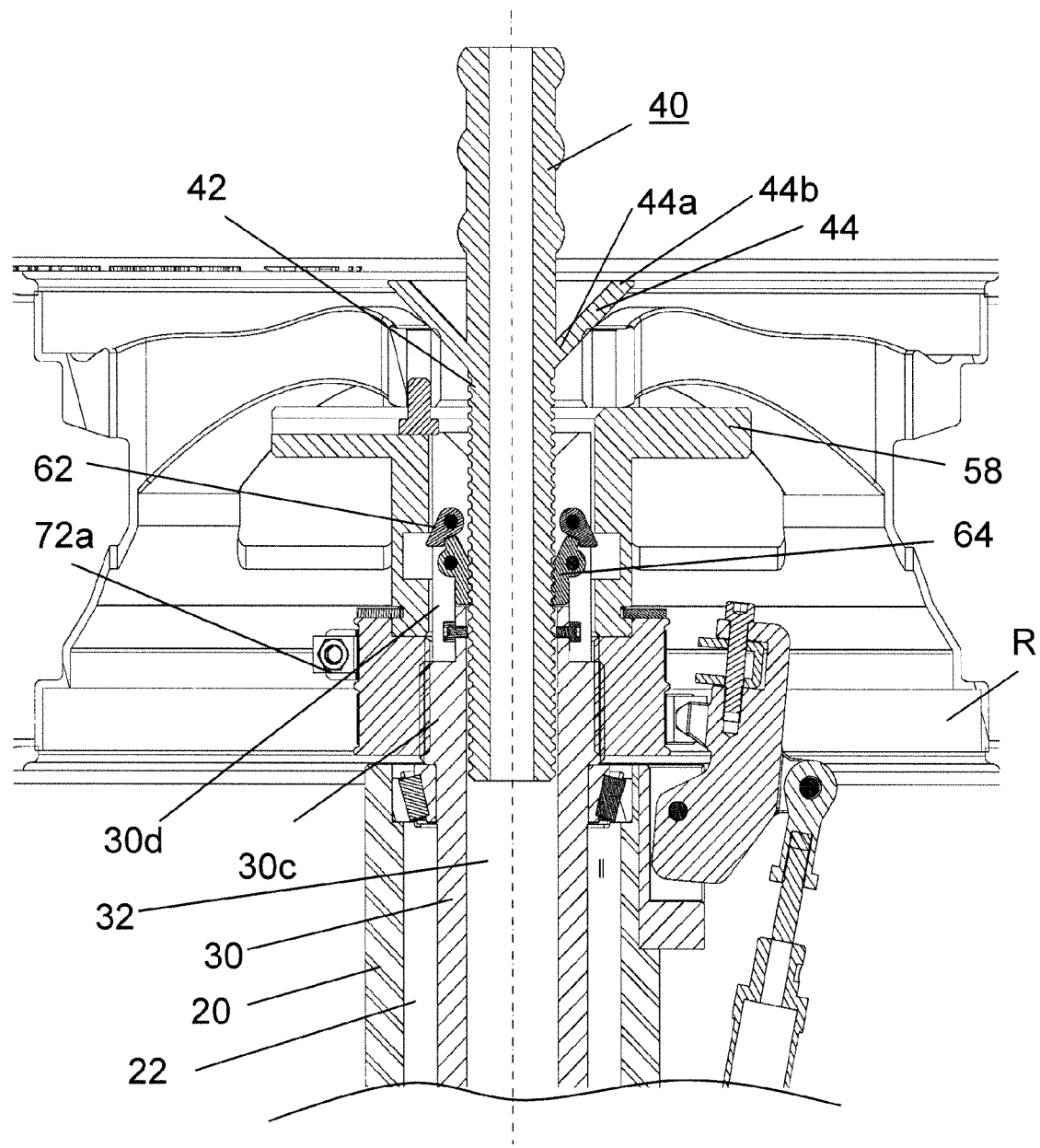
FIG. 2 shows the cross-sectional view of the inventive wheel-clamping device of FIG. 1 in a locked state
Figure 3:
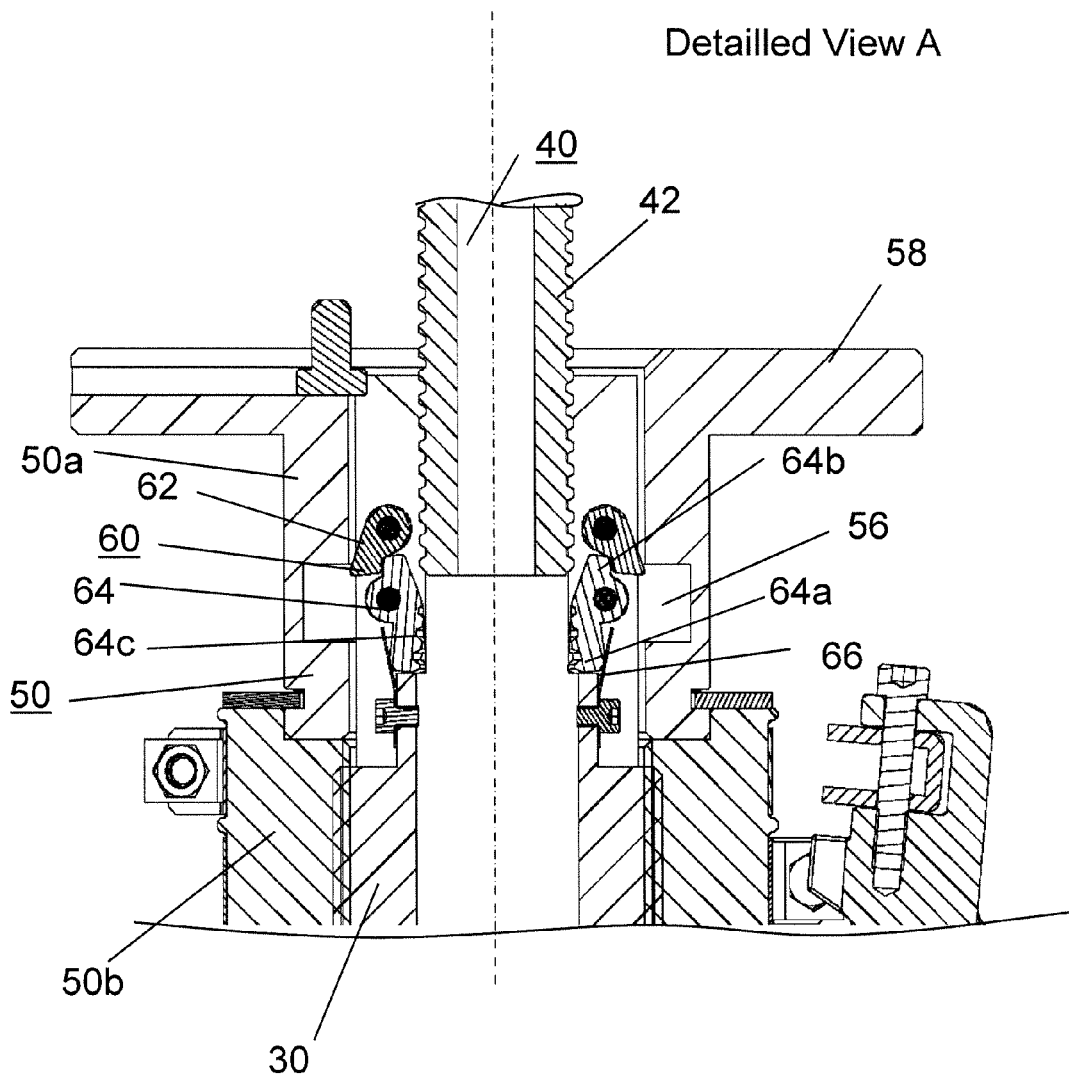
FIG. 3 shows a detailed view A of a clamping means being provided on the inventive wheel-clamping device shown in FIG. 1.
Figure 4:
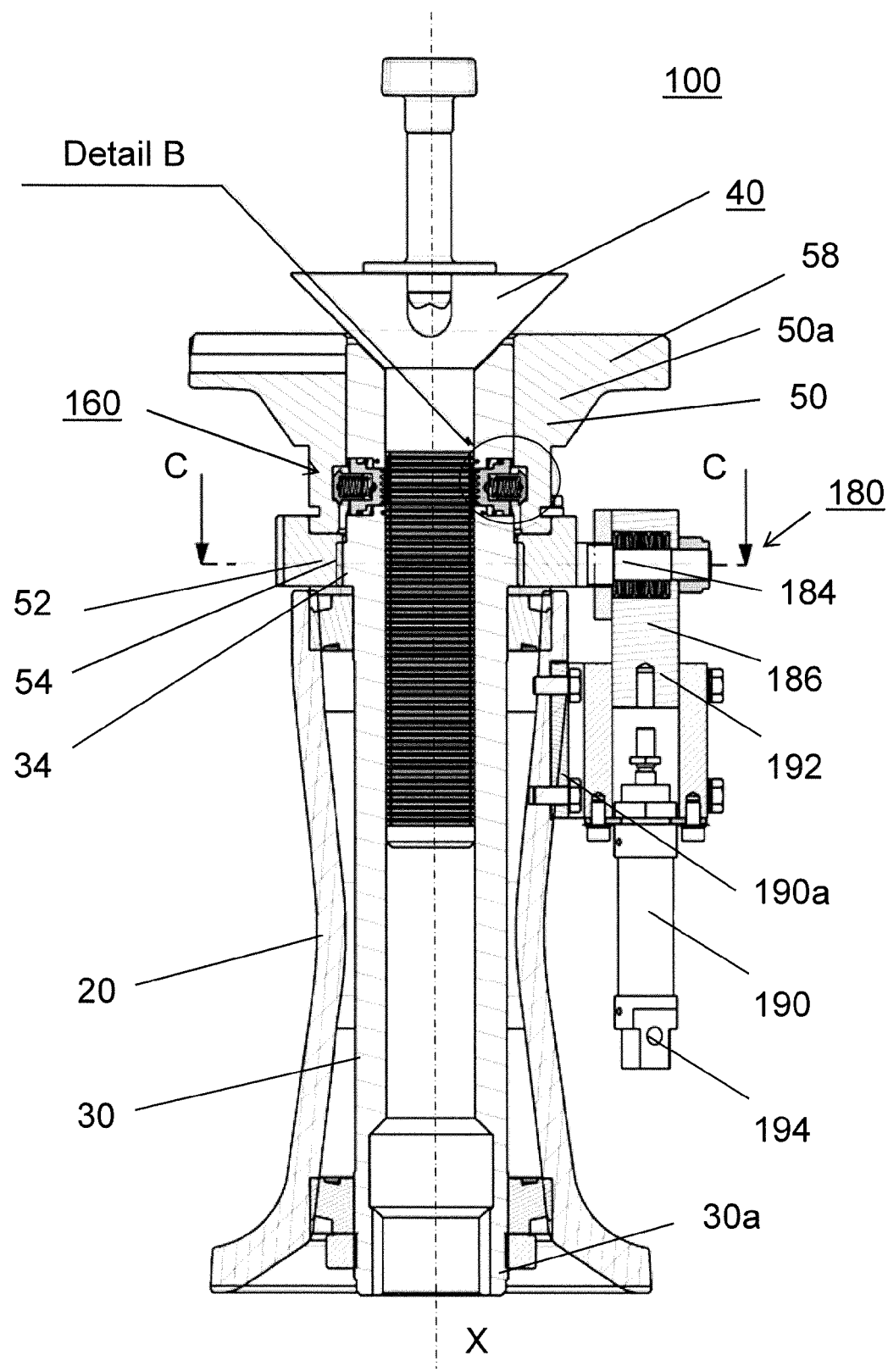
FIG. 4 shows a cross-sectional view of a second embodiment of an inventive wheel-clamping device for wheels on a turntable of a wheel-service-machine in a released state.
Figure 5:
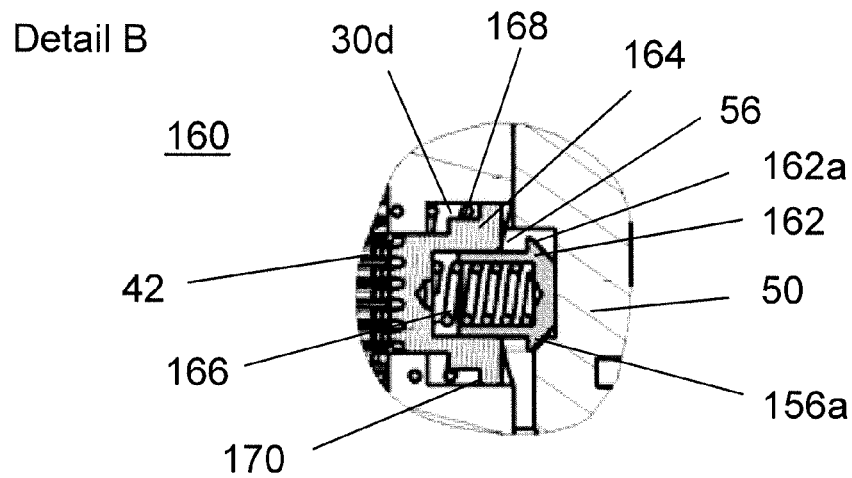
Figure 6:
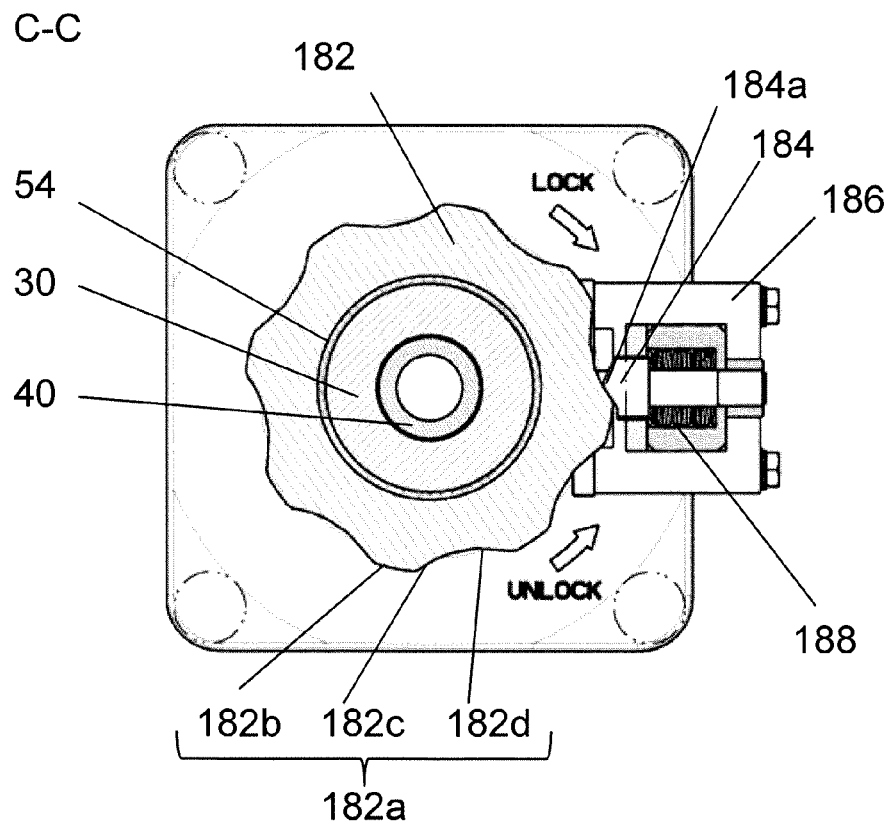
Figure 7:
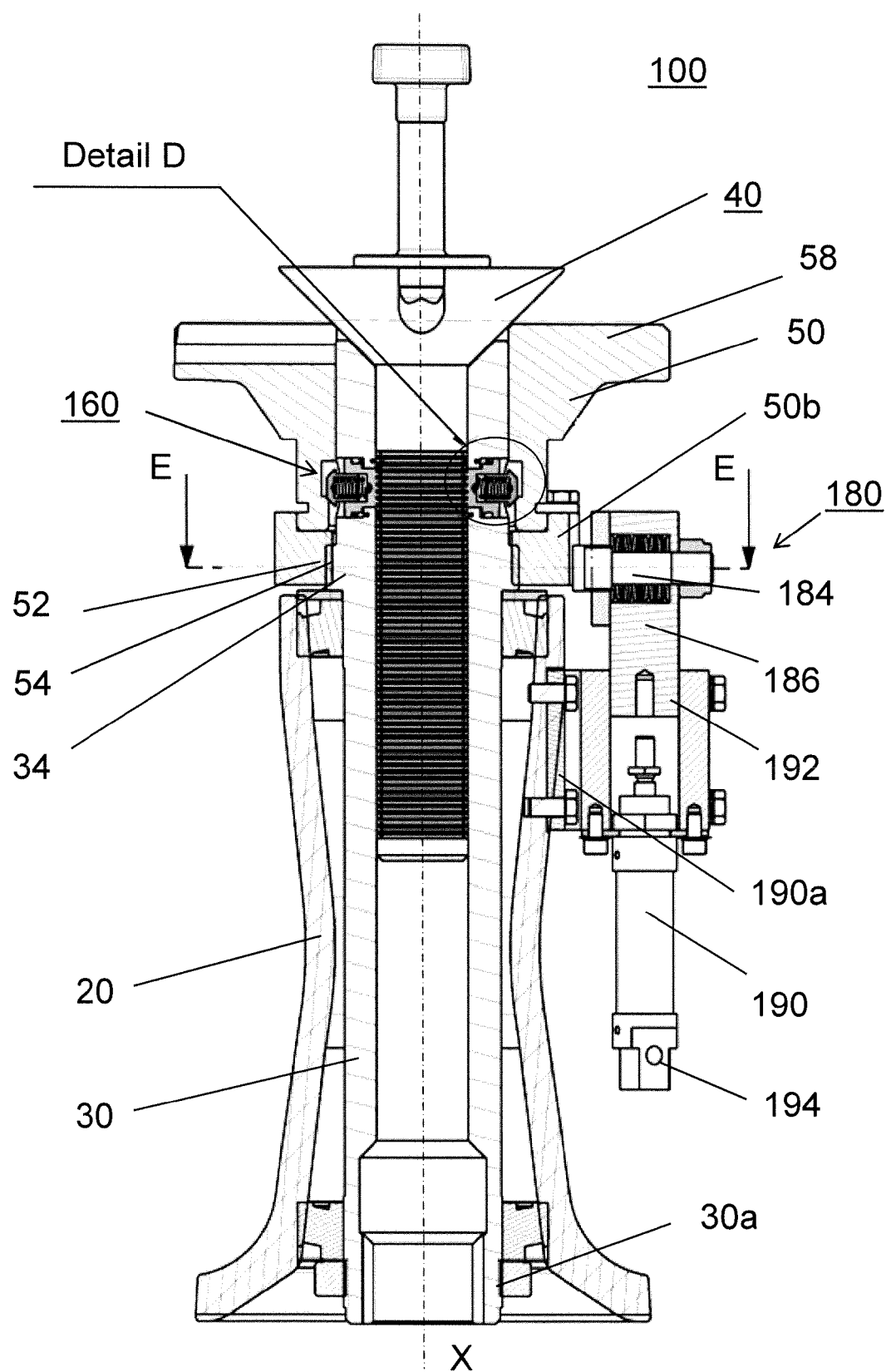
Figure 8:
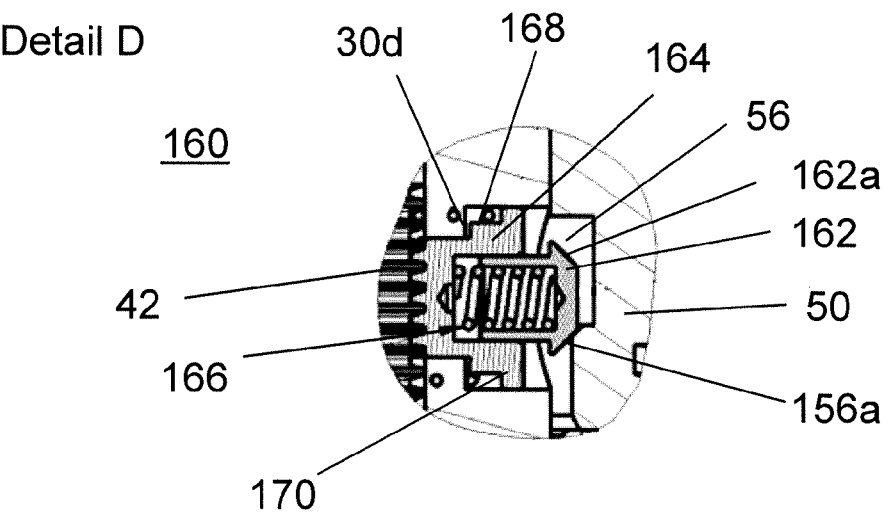
Figure 9:
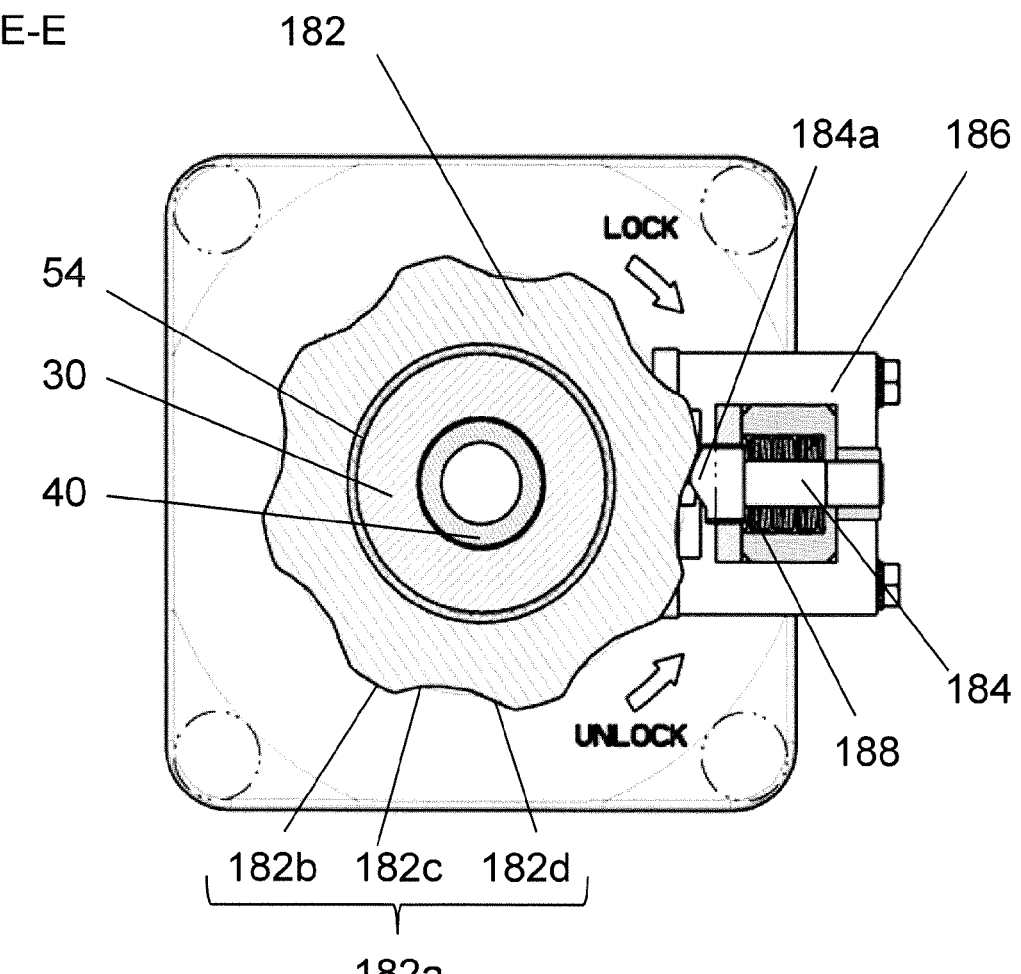

FIG. 5 shows a detailed view B of a clamping means being provided on the inventive wheel-clamping device shown in FIG. 4, in a released state FIG. 6 shows a cut-away view along cutting line C-C of FIG. 4 with the inventive wheel-clamping device being in a released state FIG. 7 shows a cross-sectional view of the inventive wheel-clamping device of FIG. 4 being in a locked state FIG. 8 shows a detailed view D of a clamping means being provided on the inventive wheel-clamping device shown in FIG. 7, in a locked state FIG. 9 shows a cut-away view along cutting line E-E of FIG. 7 with the inventive wheel-clamping device being in a locked state In a first embodiment of the present invention, a wheel-clamping device 10 as shown in FIGS. 1 to 3 comprises as main components a frame 20, a spindle 30, a fixing element 40 for temporarily fixing a rim R of a wheel at which a tyre is to be mounted or dismounted, to the wheel-clamping device 10, a sleeve 50, clamping means 60, and stopping/holding means 70, respectively. In the following, these components will be described in detail.

Frame 20 is formed by a cylindrical tube made preferably from steel. Tubular frame 20 which can be attached rigidly to a machine frame of a wheel-service-machine (not shown) being provided with the inventive wheel-clamping device 10, rotatably supports spindle 30 inside of its cylindrical through-opening 22, for example by roller bearings.

Spindle 30 which is also preferably made from steel, is connected to a driving unit, which is not shown in FIG. 1. The driving unit can be formed by an active driving device. Preferably, the driving device is an electric motor which is also used for driving the wheel-service-machine at which the inventive device 10 is provided. Moreover, the driving device is able to drive spindle 30 in a first rotation direction, as well as in a second rotating direction.

It has to be noted that spindle 30 is arranged in FIG. 1 in a vertical orientation. However, spindle 30 as well as the whole wheel-clamping device 10 can also be arranged in a horizontal orientation or in any other orientation between the horizontal and vertical orientation.

Spindle 30 has a driving-side end 30a, a mounting-side end 30b and a cylindrical through-hole 32 having an at least substantially circular cross-section. At driving-side end 30a, spindle 30 is detachably coupled to the not-shown driving unit. For said purpose, the diameter of through-hole 32 extending from driving-side end 30a, is larger than the diameter of through-hole 32 extending from mounting-side end 30b. Mounting-side end 30b faces to the location at which rim R of the wheel to be serviced, for example to be mounted with or to be demounted from a tyre, is placed.

An external thread-portion 34 is provided in the upper half of the axial length of spindle 30. For said purpose, spindle 30 is provided with an outer surface portion 30c (cf. FIG. 2) the diameter of which is larger than the diameter of spindle 30 along its remaining axial length. The offset formed thereby, is used for retaining one of the bearings rotatably supporting spindle 30 within frame 20. Moreover, above outer surface portion 30c, one or more recesses 30d are provided in the outer surface of spindle 30. In case one recess 30d is provided in the outer surface of spindle 30, recess 30d can be circumferential. In case two recesses 30d are provided in the outer surface of spindle 30, recesses 30d are arranged to each other in a position of 180°, referred to the circumferential direction of spindle 30. Recesses 30d serve to house clamping means 60 described later.

Fixing element 40 comprises a threaded rod 42 being connected fixedly to a centering cone 44 (cf. FIG. 2) both arranged along the center axis of fixing element 40 such that cone 44 is located above threaded rod 42. Further, as can be seen in FIG. 2, the end surface of cone 44 having a smaller diameter than the other end surface of cone 44 is rigidly attached to the upper end surface of threaded rod 42. In other words, threaded rod 42 is adjacent to a first end 44a of centering cone 44 being smaller than a second end 44b of the centering cone 44. Moreover, the diameter of the second end 44b of the centering cone 44 which is wider than the first end 44a of the centering cone 44, is bigger than the diameter of through-hole 32 of spindle 30. The center axis of fixing element 40 is coaxial to the center axis of spindle 30 and sleeve 50. Fixing element 40 is preferably made from steel.

Threaded rod 42 of fixing element 40 can be inserted through a central hole of rim R of the wheel being placed onto a turntable 58 of sleeve 50 described later, and further into through-hole 32 of spindle 30 along the center axis of spindle 30. According to this movement, first end 44a of centering cone 44 being smaller than its second end 44b, and being adjacent to threaded rod 42, comes in firm contact with the central hole of rim R in order to fix rim R onto turntable 58 of sleeve 50.

Sleeve 50 surrounds the upper part of the external surface of spindle 30 at which external thread-portion 34 is provided in the upper half of the axial length of spindle 30. The center axes of spindle 30 and sleeve 50 coincide with each other and also together with said of frame 20. Sleeve 50 is rotatably supported onto frame 20 by a bearing arrangement.

Further, sleeve 50 extends along the center axis away from frame 20. Moreover, sleeve 50 is preferably made from steel.

Sleeve 50 comprises an internal thread-portion 52 provided in the lower part of the axial length of sleeve 50, as can be seen in FIG. 1. Internal thread-portion 52 of sleeve 50 is located at the same axial height along the center axis as external thread-portion 34 of spindle 30. Furthermore, internal-thread portion 52 of sleeve 50 is in engagement with external thread-portion 34 of spindle 30 in a threaded coupling 54. Said coupling 54 is used for the purpose of actuating clamping means 60 as described later.

At the upper end 50a of circular sleeve 50 which is adjacent to mounting-side end 30b of spindle 30, turntable 58 is provided rigidly connected to sleeve 50 (in principle, sleeve 50 and turntable 58 can also be formed by a single component). On turntable 58 rim R of the wheel to be serviced can be placed.

Sleeve 50 that partially surrounds spindle 30, provides a preferably completely circulating recess 56 on its internal surface at an axial position adjacent to clamping means 60. In an initial state in which spindle 30 is not rotated, the axial position of recess 56 is lower than the axial position of clamping means 60.

As already mentioned above, clamping means 60 are arranged in recesses 30d of spindle 30. Clamping means 60 comprise in each recess 30d a clamping claw actuator 62 which can rotate or swivel in an at least substantially vertically extending plane about an axis or pin, respectively, extending in an at least approximately horizontal direction and shown in FIGS. 1 to 3, but not designated, and which is able to actuate a clamping claw 64 which can also rotate or swivel in an at least substantially vertically extending plane about an axis or pin, respectively, extending in an at least approximately horizontal direction and shown in FIGS. 1 to 3, but not designated, too.

As can be seen in FIG. 3, clamping claw actuator 62 of each clamping means 60 is located mainly on the external surface of spindle 30 facing the internal surface of sleeve 50, while clamping claw 64 is provided mainly on the internal surface of spindle 50. Moreover, clamping claw 64 is spring loaded on its lower end by a spring 66 in a direction to the outside of spindle 30. A lower end 64a of clamping claw 64 has a threaded surface facing to and being adjacent to the internal surface of the spindle 30. As a result of the spring load, the part of clamping claw 64 facing to the internal surface of spindle 30 and having a threaded surface, tends to engage the threaded surface of threaded rod 42. Clamping claw actuator 62 which is put under pressure by the internal surface of sleeve 50, puts pressure on an upper end 64b of clamping claw 64. Thereby, lower end 64a of the clamping claw 64 is tilted away from threaded rod 42, and thus, clamping claw 64 is not able to engage threaded rod 42 inside the through-hole 32 of spindle 30 with its spring loaded lower end 64a. Thus, in an initial or release state with no movement of sleeve 50 in axial direction, fixing element 40 can be moved unresistingly inside through-hole 32 of spindle 30.

In order to clamp fixing element 40 in through-hole 32 of the spindle 30, clamping means 60 have to clamp threaded rod 42 of fixing element 40. Therefore, clamping claw actuator 62 of each clamping means 60 has to loose its pressure on the upper end 64b of clamping claw 64. This enables the spring loaded clamping claw 64 to engage threaded rod 42 of fixing element 40 and to come into a locked state.

To enable clamping claw actuator 62 to loose its pressure on clamping claw 64, recess 56 cut in sleeve 50 has to move, together with sleeve 50, such that the internal surface of sleeve 50 does not further put clamping claw actuator 62 under pressure. In order to allow sleeve 50 to undergo a movement in axial direction, sleeve 50 is connected to stopping/holding means 70.

Stopping/holding means 70 comprise a clutch pack 72 which is shown in FIG. 1 and which surrounds an axial section of the outer surface of sleeve 50. A holder 74 being part of the stopping/holding means 70, holds clutch pack 72 on a rotationally fixed position. Clutch pack 72 itself applies frictional forces onto sleeve 50 which is thereby rotationally fixed, too. Holder 74 is further provided on a holder-side end 76a of a pivoting arm 76, while a frame-side end 76b of the pivoting arm 76 is pivotably connected to tubular frame 20. Moreover, holder 74 is preferably made from steel. Clutch pack 72 is in general made from steel, too, but can additionally be provided with friction pads or the like having material properties which allow clutch pack 72 to apply frictional forces up to a predetermined amount.

As already mentioned above, clutch pack 72 is generally disposed surrounding the circumference of an axial section of the outer surface of sleeve 50, whereas the inner surface of clutch pack 72 touching the circumference of the lower part of sleeve 50. Further, clutch pack 72 comprises a first clutch 72a and a second clutch 72b, being arranged adjacent to each other along the axial direction of the center axis of sleeve 50. First clutch 72a applies frictional forces onto sleeve 50 when spindle 30 rotates in the first rotating direction. Thereby, sleeve 50 shall be driven in the first rotating direction, too, because of its threaded engagement with spindle 30.

In case, sleeve 50 shall be driven by spindle 30 in the second rotating direction, second clutch 72b applies frictional forces onto sleeve 50. Generally, the frictional forces which can be applied from second clutch 72b are higher than the frictional forces, first clutch 72a is able to apply.

The first embodiment of the inventive wheel-clamping device 10 operates as follows:

Locking and Operational Run

The wheel comprising a tyre/rim combination or a rim R, respectively, to be serviced is placed onto turntable of the inventive wheel-clamping device 10 being in the released state as shown in FIG. 1. Next, threaded rod 42 of fixing element 40 is guided through the central hole of rim R into through hole 32 of spindle 30 (cf. FIG. 2). Thereby, threaded rod 32 slides downwardly into through-hole 32 without resistance, whereby first end 44a of centering cone 44 comes in firm contact with the central hole of rim R.

In case spindle 30 starts to rotate in the first rotating direction, sleeve 50 which is rotationally fixed by clutch pack 72, in particular by first clutch 72a hold by holder 74, moves upwardly along the center axis in the direction to mounting-side end 30b of spindle 30. Thus, sleeve 50 performs a linear movement along the center axis of spindle 30 caused by threaded engagement between spindle 30 and sleeve 50 and the rotation of spindle 30. In particular, sleeve 50 is not able to follow the rotary movement of spindle 30 since sleeve 50 is hold in angular position by the frictional contact caused by stopping/holding means 70, in particular by first clutch 72a, supported by holder 74. Second clutch 72b is not employed while spindle 30 rotates in the first rotating direction. Since turntable 58 is rigidly connected to sleeve 50, turntable 58 is forced to follow the linear movement of sleeve 50 induced by the rotating movement of spindle 30.

As already mentioned above, recess 56 is provided on the inner surface of sleeve 50. In the initial state, the axial position of recess 56 is adjacent to the axial position of clamping means 60. The linear movement of sleeve 50 resulting from the screwing movement of the spindle 30, contains also a linear movement of recess 56. Therewith, as a result of the linear movement of sleeve 50, the axial position of recess 56 coincides with the axial position of clamping claw actuator 62 on the external of spindle 50.

Therewith, clamping claw actuator 62 is no longer pressed against clamping claw 64, because clamping claw actuator 62 moves outwardly in recess 56 which is cut in inside surface of sleeve 50, as already mentioned above. This movement of clamping claw actuator 62 allows spring loaded clamping claw 64 to threadingly engage threaded rod 42. Thereby, threaded rod 42 being part of fixing element 40, is fixed in through-hole 32 of spindle 30.

As described above, the screwing movement of sleeve 50 moves also turntable 58, which is provided rigidly connected to sleeve 50 and is adjacent to mounting-side end 30b of spindle 30, and is thereby pressed against wheel rim R. Wheel rim R itself is thereby pressed against centering cone 44. This linear movement of sleeve 50, together with wheel rim R against centering cone 44 also centers wheel rim R onto the center axis.

Thereby, the linear movement of sleeve 50 towards the axial direction of mounting-side end 30b of spindle 30 initiates a process of clamping fixing element 40, and further, simultaneously initiates a process of centering rim R onto center axis of spindle 30 and fixing element 40.

As soon as the rotary movement in the first rotating direction, applied by drive means onto spindle 30, overcomes a predetermined driving force, the frictional contact between clutch pack 72, in particular first clutch 72a, which is hold in angular position by holder 74, and sleeve 50 gets loose. Then, sleeve 50 follows directly the rotating movement in the first rotating direction, initiated by spindle 30. Thereby, sleeve 50, which is now rigidly connected to spindle 30 and no longer hold in angular position by stopping/holding means 70, can follow the rotary movement of spindle 30, and the operation run can immediately follow the reversion of fixation of spindle 30 and sleeve 50. This further rotating movement can now be used for performing a wheel-service-operation on the wheel-service-machine, for example a tyre-changing procedure on a tyre-changing machine in which a tool is penetrating the wheel.

Thus, the rotating movement of spindle 30, initiated by the drive unit, is firstly used and transformed by a transmission in the linear movement of sleeve 50 to actuate clamping means 60 to clamp fixing element 40, and thereby to fix rim R of the wheel rigidly to drive spindle 30. FIG. 2 shows the locked state of the inventive wheel-clamping device 10.

Unlocking and Releasing the Rim

After finishing the operation run on the wheel-service-machine, fixing element 40 has to be unlocked from sleeve 50 prior to removing the wheel with its wheel rim R or a rim R alone, respectively, from turntable 58.

Therefore, spindle 30, starting from a non-rotating halt-position, has to be rotated in the second rotating direction. As soon as spindle 30 initiates a driving movement onto sleeve 50 in the second rotating direction, stopping/holding means 70, in particular second clutch 72b, applies frictional forces onto sleeve 50 against the initiated rotary movement driven by spindle 30. First clutch 72a is not employed while spindle 30 rotates in the second rotating direction. Thus, the rotary movement in the second rotating direction, applied onto sleeve 50 by spindle 30, leads to a linear movement of sleeve 50 along the center axis of spindle 30 in the direction of its driving-side end 30a. The linear movement is induced by the rotating movement of spindle 30 being threadingly engaged with sleeve 50, while sleeve 50 is rotationally fixed by second clutch 72b, supported by holder 74. Generally, the frictional forces needed for releasing threaded coupling 54 are higher than the frictional forces needed for engaging threaded coupling 54. Therefore, the forces which can be applied from second clutch 72b are higher than the frictional forces, first clutch 72a is able to apply.

Turntable 58 being rigidly connected to sleeve 50, follows the linear movement of sleeve 50, thereby the pressure from turntable 58 onto wheel rim R and centering cone 44 decreases.

Further, recess 56, being located on inner surface of sleeve 50 moves with the linear movement of sleeve 50 in the direction of driving-side end 30a, away from the mounting-side end 30b. So, the inner surface of sleeve 50 slips over clamping claw actuator 62 again. Thereby, the inner surface of sleeve 50 presses against clamping claw actuator 62, which itself presses on upper end 64b of clamping claw 58. This leads to the fact, that spring loaded lower end 64a of clamping claw 64 is lifted out of its threaded engagement with threaded rod 42.

As soon as lower end 64a of clamping claw 64 is lifted out of its threaded engagement with threaded rod 42, fixing element 40 is no longer clamped in through-hole 32. Additionally, as already mentioned above, centering cone 44 is no longer set under pressing force, because turntable 58 and wheel rim R being placed onto, follow the linear movement of sleeve 50 along the center axis of spindle 30 in the direction of its driving-side end 30a.

As a result of the linear movement of sleeve 50 for reaching the initial state, initiated by a rotation of spindle 30 in the second rotating direction, fixing element 40 can be removed from through-hole 32 of spindle 30, and rim R can be lifted away from turntable 58.

Therewith, the inventive wheel-clamping device 10 reaches released state, as shown in FIG. 1.

In FIGS. 4 to 9, an inventive wheel clamping device 100 for wheels on a turntable of a wheel-service-machine is shown in a second embodiment of the present invention. The main components frame 20, spindle 30, fixing element 40 and sleeve 50 correspond to the first embodiment of the present invention, already explained above. The arrangement of frame 20, spindle 30, fixing element 40 and sleeve 50 corresponds to the first embodiment, too, so that the same references signs are used in the following. Moreover, clamping means 160 and stopping/holding means 180 are provided. Clamping means 160 and stopping/holding means 180 will be described in detail in the following.

As already mentioned above for the first embodiment of the present invention, the driving device being connected to spindle 30 on its driving-side end 30a, is able to drive spindle 30 in the first rotation direction, as well as in the second rotating direction.

Furthermore, it has to be noted that spindle 30 as well as the whole wheel-clamping device 100 is arranged in FIG. 4 in a vertical orientation, but can also be arranged in a horizontal orientation or in any other orientation between the horizontal and vertical orientation which is also true for the first embodiment shown in FIGS. 1 to 3.

Clamping means 160 are provided in recesses 30d being located at the upper half of spindle 30 in the direction of turntable 58. Recesses 30d are cut in spindle 30 from the outside diameter of spindle 30 facing the inside diameter of frame 20 to the inside diameter of spindle 30 facing threaded rod 42 of fixing element 40, wherein fixing element 40 is inserted in through-hole 32 of spindle 30. With the inventive wheel-clamping device 100 being in released state as shown in FIG. 4, recess 56 is provided on the same axial position than recess 30d, wherein recess 56 is located on the middle part in axial direction of the sleeve 50 and cut in its inside surface. Therewith, recess 56 and recess 30d are facing each other. In the second embodiment, recess 56 is circumferentially cut in the inner surface of sleeve 50. Furthermore, it is possible, that recess 56 is not cut circumferentially, but a number of single segmental recesses 56 can be cut in sleeve 50, wherein the number of recesses 56 is equal to or different from the number of clamping means 160, and wherein the recesses 56 are distributed at equal angular distances.

At least two clamping means 160 are provided such that the angular distances the clamping means 160 are spaced apart from each other are equal. Clamping means 160 being in released state are in detail shown in FIG. 5.

Each clamping means 160 has a clamping claw actuator 162 and a clamping claw 164. Clamping claw 164 has the form of an one-side-closed cylinder being arranged at least approximately in a radial direction referred to spindle 30, wherein the closed outer side of the cylinder is outside-threaded and adapted to engage threaded rod 42 of fixing element 20. Thus, clamping claw 164 is positioned such that the closed outer side of clamping claw 164 is directed to the inner surface of spindle 30, wherein the open side of the one-side-closed cylinder is directed radially outwardly from spindle 30. It has to be noted, that the length of the cylindrical side of clamping claw 164 is provided such that the clamping claw 164 is not protruding from outside diameter of spindle 30.

Clamping claw actuator 162 is in form of an one-side-closed cylinder, too, and is also located at least approximately radial to spindle 30. The closed end of the one-side-closed cylinder that represents clamping claw actuator 162 is adapted to be located in recess 56 of sleeve 50. The cylindrical walls of the one-side-closed cylinder that represents clamping claw actuator 162, reach into recess 30d of spindle 30, where clamping claw 164 is located. Moreover, the closed end of the one-side-closed cylinder of clamping claw actuator 162 having a larger diameter than the part of clamping claw actuator 162 being arranged inside the one-side-closed cylinder representing clamping claw 164 so that clamping claw actuator is mushroom-shaped, provides a chamfer 162a on its very outer edge. An axial height of recess 56 cut into the inner surface of sleeve 50 has at least the dimension of the maximum outer diameter of the closed cylinder side of clamping claw actuator 162. Moreover, recess 56 provides a chamfer 156a on its lower side being directed to frame 20 and therewith opposite to turntable 58. Chamfer 162a of clamping claw actuator 162 and chamfer 156a of recess 56 are adapted to match and to slide against each other.

Clamping claw actuator 162 has a smaller outer cylinder diameter than the inner cylinder diameter of one-side-closed cylinder representing clamping claw 164. Therewith, radially outside directed one-side-closed clamping claw actuator 162 is placed in radially inside directed one-side-closed clamping claw 164 in a telescoping manner such that the cylindrical outside surface of clamping claw actuator 162 is partially touchingly contacting the cylindrical inside diameter of clamping claw 164.

A reinforcing spring 166 is placed inside the cylindrical volume defined by both one-side-closed cylinders of clamping claw actuator 162 and clamping claw 164 (cf. FIGS. 6, 8). Reinforcing spring 166 braces against the inner surfaces of the closed cylinder sides of both components, namely clamping claw actuator 162 and clamping claw 164. In case clamping claw actuator 162 moves radially inward in a direction towards fixing element 40 being placed inside through-hole 32 of spindle 30, reinforcing spring 166 pressurizes clamping claw 164 and initiates a movement of clamping claw 164 in the direction towards the fixing element 40 and threaded rod 42, respectively.

Furthermore, a releasing spring 168 is provided. Releasing spring 168 is located partially in spindle 30 and is leant against a collar 170 protruding outwardly from the cylinder walls of the open side end of the one-side-open cylinder of clamping claw 164. Therewith, clamping claw 164 is initially influenced by releasing spring 168 to not engage threaded rod 42 inside through-hole 32 of spindle 30.

Lower end 50b of sleeve 50 is in threaded coupling 54 via its internal thread portion 52 with external thread portion 34 on spindle 30, as already explained with the first embodiment of the present invention.

As can be seen in FIG. 6, which is a cut away view along line C-C of FIG. 4, sleeve 50 is surrounded by a nut-profile 182 which is located in the axial area of lower end 50b of sleeve 50. It is further possible that lower end 50b of sleeve 50 itself provides the geometrical outside form of a nut similar to the one shown in FIG. 6. However, the provision of a detachable nut-profile 182 provides the advantage of using alternative profiles or replacing a worn nut-profile 182 without replacing sleeve 50 itself.

A cursor 184 shown also in FIG. 4, is adapted to get into contact with nut-profile 182. Cursor 184 is located in a cursor casing 186 and is spring loaded in cursor casing 186 by a cursor spring 188. Cursor casing 186 is connected to a cylinder 190, which can e.g. be a pneumatically driven cylinder. Cylinder 190 has a piston 192 wherein cylinder 190 as well as a moving direction of piston 192 are orientated parallel to a common middle axis X of wheel-clamping device 100, spindle 30, fixing means 40 and sleeve 50. Moreover, cylinder 190 is detachably connected onto frame 20 by cylinder connection means 190a. Cylinder 190 can be activated by a cylinder supply 194. The activation of cylinder supply 194 moves piston 192 in a direction parallel to common middle axis X.

Cursor casing 186 housing cursor 184 is rigidly connected to piston 192. This leads to the fact that an activation of cylinder 190 via its cylinder supply 194 moves cursor casing 186 together with cursor 184 along a direction parallel to common middle axis X. As can be seen in FIG. 4, cylinder 190 is activated by cylinder supply 194, and piston 192 together with cursor casing 186 is extended towards the turntable 58. Piston 192 together with cursor casing 186 is extended such that cursor 184 is facing nut-profile 182. Cursor spring 188 springs or forces cursor 184 such that cursor 184 is pressed against nut-profile 182.

Nut-profile 182 surrounding lower end 50b of sleeve 50, as in detail shown in FIG. 6, is circumferentially divided in nut-segments 182a. As can be seen in FIG. 6, the present embodiment provides eight nut-segments 182a. Each nut-segment 182a provides two radial protrusions 182b bordering an unlocking-ramp 182c adjacent in radial direction to a locking-ramp 182d. Cursor 184 is adapted to slide along unlocking-ramp 182c as well as along locking-ramp 182d. Because of the fact that a tip 184a of cursor 184 is adapted to slide on both, unlocking-ramp 182c and locking-ramp 182d, the geometry of tip of cursor 184a is adapted to match both unlocking-ramp 182c and locking-ramp 182d.

In case the first rotating direction is a clockwise rotation, nut-segments 182a are arranged such that radial protrusion 182b is adjacent to locking-ramp 182d which is adjacent to unlocking-ramp 182c, which itself is adjacent to radial protrusion 182b, being further adjacent to locking-ramp 182d and so on. If the first rotation direction is a counterclockwise rotation, than the orientation of locking-ramp 182d and unlocking ramp 182c is reversed.

If spindle 30 rotates sleeve 50 by means of their threaded coupling 54 in the first rotating direction being clockwise, cursor 184 having tip of cursor 184a, which is pressurized by cursor spring 188 and axially positioned by cylinder 190, is pressed on—and slides along—unlocking-ramp 182c with decreasing gradient, and locking-ramp 182d with rising gradient. In case spindle 30 rotates sleeve 50 by means of their threaded coupling 54 in the second rotating direction, cursor 184 is pressed on—and slides along—locking-ramp 182d with then decreasing gradient and unlocking ramp 182c with rising gradient.

A radial gradient of unlocking-ramp 182c is stronger than a radial gradient of locking-ramp 182d. Spindle 30 together with sleeve 50 rotating in a first rotating direction result in frictional forces in threaded engagement As can be seen in FIG. 6 in which innovative wheel-clamping device 100 is shown in released state, cursor 184 having tip 184a of cursor 184 is in a frictionally fixed connection with unlocking-ramp 182d.

In FIG. 7, the inventive wheel-clamping device in its second embodiment is shown in a locked state. It is obvious that sleeve 50 together with turntable 58 and lower end 50b of sleeve 50 is in a slightly uplifted position away from a sleeve-side end of frame 20 in a direction towards a wheel which is adapted to be placed onto turntable 58. Furthermore, cylinder 190 is activated such that piston 192 was moved towards turntable 58 parallel to common middle axis X. Together with piston 192, cursor casing 186 housing cursor 184 was moved. Cursor 184 is in a frictionally fixed connection with nut-profile 182.

With the linear movement of sleeve 50, also recess 56 cut in the inside surface of sleeve 50, is moved towards the wheel. Clamping means 160 which are provided on axially fixed spindle 30 are not moved in axial direction. Therewith, clamping claw actuator 162 is no longer located in recess 56 of sleeve 50, as it is shown in FIG. 8. Clamping claw actuator 162 is leant against the inner wall of sleeve 50, and reinforcing spring 166 is pressed by clamping claw actuator 162 against clamping claw 164 such that clamping claw 164 is forced to engage threaded rod 42 of fixing element 40, being placed inside through hole 32 of spindle 30. Obviously, also releasing spring 168 is pressurized by a movement of clamping claw 164 towards threaded rod 42 of fixing element 40 located in through-hole 32 of spindle 30.

Furthermore, as it is explained in FIG. 9, cursor 184 together with its tip 184a is pressed on locking-ramp 182d of nut-profile 182 surrounding lower end of sleeve 50b.

The second embodiment of the inventive wheel-clamping device 100 operates as follows:

Locking and Operational Run

As it is already explained with the first embodiment, also with the second embodiment the tyre/rim wheel combination or the rim R alone, respectively, to be serviced is placed onto turntable 58 of inventive wheel-clamping device 100, which is in a released state as shown in FIG. 4. Threaded rod 42 is guided through the central hole of rim R (in FIG. 2, the wheel together with rim R being placed onto turntable 58 can be seen) in through-hole 32. As it is further already explained together with the first embodiment, the centering cone 44, in particular first end of centering cone 44a comes into firm contact with the central hole of rim R.

Cylinder 190 is actuated by its cylinder supply 194 such that its piston 192 together with cursor casing 186 housing cursor 184 is moved upwardly towards turntable 58 to that extent, that cursor 184, in particular tip of cursor 184a, reaches contact with nut-profile 182 surrounding lower end of sleeve 50b, as it is already shown in FIG. 4.

As soon as spindle 30 being connected to the drive means on its driving-side end 30a starts to rotate in the first rotating direction, sleeve 50 which is engaged with spindle 30 in threaded coupling 54, starts to rotate, too. Cursor 184 pressurized by cursor spring 188 is leant against nut-profile 182. In particular, tip of cursor 184a is abutted against nut-profile 182. Independent from any starting position from which nut-profile 182 experiences frictional contact from tip of cursor 184, the rotation in the first rotating direction, initiated by spindle 30, brings tip of cursor 184 to reach frictionally fixed connection with locking-ramp 182d. The rising gradient of locking-ramp 182d to which cursor 184 is frictionally connected, prevents nut-profile 182 together with sleeve 50 from following the rotating movement in the first rotating direction. Thus, sleeve 50 being rotationally hold by cursor 184 being in frictionally fixed connection with locking-ramp 182d. Sleeve 50 performs a linear movement along the center axis of spindle 30 corresponding to common axis of rotation X caused by threaded engagement between spindle 30 and sleeve 50, and the rotation of spindle 30. Turntable 58 which is rigidly connected to sleeve 50, is forced to follow the linear movement of sleeve 50 induced by the rotating movement of spindle 30. The result of said linear movement along the center axis of spindle 30 can be seen in FIG. 7 where sleeve is lifted up from the sleeve-side end of frame 20.

Sleeve 50 is linearly axially moved upwardly in the direction away from frame 20. The linear movement of sleeve 50 leads to the fact that recess 56 is no longer coinciding with clamping means 160 of wheel-clamping device 100. The closed end of clamping claw actuator 162 which was located in recess 56 of sleeve 50 while released state, slips by means of its chamfer 162a along chamfer 156a of recess 56 out of recess 56 as can be seen in FIG. 8. This leads to the fact that clamping claw actuator 162 performs a radial movement towards clamping claw 164, and finally, the closed end of clamping claw actuator 162 is leant against the inner surface of sleeve 50. Therewith, reinforcing spring 166 is pressurized by the closed end of clamping claw actuator 162. The radial movement of clamping claw actuator 162 together with the pressurization by reinforcing spring 166 leads to a radial movement of clamping claw 164 towards threaded rod 42 of fixing element 40. Therewith, the linear movement of sleeve 50 along the axial direction away from frame 20 leads to the engagement of clamping claw 164 with threaded rod 42.

As already explained with the first embodiment, the linear movement of sleeve 50 also moves turntable 58 because of its rigid connection with sleeve 50. Therewith, turntable 58 is pressed against the wheel rim R placed onto. Wheel rim R itself is pressed against centering cone 44, in particular against first end of centering cone 44a, Centering cone 44 centers the wheel rim R onto common middle axis X.

Furthermore, the linear movement of sleeve 50 serves for an enforced frictional contact in threaded coupling 54, which leads to the fact that even when the sleeve 50 is no longer rotationally hold by stopping/holding means, sleeve 50 is prevented from autonomous unscrewing by the enforced frictional contact. Sleeve 50 may further be prevented from autonomous unscrewing by a flat key (not shown) being provided between sleeve 50 and spindle 30. The flat key may be provided adjacent to clamping means 160 in a direction towards turntable 58.

The sleeve 50 has to undergo a predetermined linear movement, defined by its height, such that a secure clamping of threaded rod 42 by clamping claw 164 is performed. The achievement of the predetermined linear movement of sleeve 50 can be determined by sensing means. As soon as the predetermined linear movement of sleeve 50 is reached, cylinder 190 is deactivated such that piston 192 is pulled backwards. Therewith, also cursor casing 186 together with cursor 184 is moved parallel to common middle axis X in a direction towards driving side end 30b of spindle 30. This leads to the fact that tip 184a of cursor 184 provided by cursor 184, is pulled out of its frictionally fixed connection with locking-ramp 182d of nut-profile 182. As soon as the frictionally fixed connection of tip 184a of cursor 184 with locking-ramp 182d is detached, sleeve 50 is no longer blocked and also no longer prevented from following the rotating movement in the first rotating direction, initiated by sleeve 30 via threaded coupling 54.

For performing the pulling movement of piston 192, spindle 30 may be decelerated to a stopping position, however, this is not obligatory.

As soon as cursor 184 is no longer contacting nut-profile 182 in a frictionally fixed manner, and therewith cursor 184 no longer holds sleeve 50 rotationally fixed, sleeve 50 is adapted to follow the rotation in the first rotating direction, initiated by spindle 30. Thereby, sleeve 50 is now rigidly connected to spindle 30 and no longer hold in rotationally fixed position. The operational run can immediately be performed such, that the rotating movement in the first rotating direction can be used for performing a wheel-service-operation on the wheel-service machine using the wheel-clamping device 100.

Unlocking and Releasing the Rim

After finishing the operational run on the wheel-service-machine, fixing element 40 has to be unlocked from its engagement such that the tyre/rim wheel combination or rim R alone, respectively, can be uplifted from turntable 58.

Therefore, starting from a non-rotating state of spindle 50, cylinder 190 is actuated by cylinder supply 194 such that piston 192 is moved in a direction towards turntable 58 parallel to common middle axis X. The movement of piston 192 also moves cursor casing 186 together with sprung cursor 184 because of the rigid connection of piston 192 and cursor casing 186 wherein the movement of piston 192 is performed to such an extent that cursor 184, in particular tip 184 of cursor 184, contacts nut-profile 182 again. This position is shown in FIG. 7.

For unlocking the clamping and releasing rim R, spindle 30 has to be rotated by the drive unit in the second rotating direction, being opposite to the first rotating direction. As soon as spindle 30 rotates in the second rotating direction, sleeve 50 which is engaged with spindle 30 in threaded coupling 54, is affected to rotate, too. Now, when spindle 30 rotates in the second rotating direction, cursor 184 is leant against nut profile 182 on the other side of the nut-segment 182a, cursor 184 gets in contact with. The rotation in the second rotating direction brings tip 184a of cursor 184 into a frictional contact with unlocking-ramp 182c, what is shown in FIG. 6. The rising gradient of unlocking-ramp 182c which cursor 184 is frictionally contacting, is stronger than the rising gradient of locking-ramp 182d. Therefore, with equal pressure, the tip 184a of cursor 184 exerts pressure on ramps 182c, 182d as a result of cursor spring 188. The frictional forces which can be applied from cursor 184 onto nut-profile 182 when frictionally contacting unlocking-ramp 182c are remarkably higher than the frictional force which can be applied from cursor 184 onto nut-profile 182 when frictionally contacting locking-ramp 182d. The different provision of rising gradients in unlocking-ramp 182c and locking-ramp 182d takes in account, that the unlocking of a frictional contact requires higher forces for overcoming the frictional contact than the forces which were applied to establish a frictional contact.

Once cursor 184 frictionally contacts unlocking-ramp 182c as can be seen in FIG. 9, a frictionally fixed connection is established, and lower end of sleeve 50b together with sleeve 50 is kept away from following the rotational movement in the second rotating direction, initiated by spindle 30. The rotationally hold sleeve 50 is in threaded coupling 54 with spindle 30. This leads to the fact that sleeve 50 together with turntable 58 performs a linear movement along common middle axis X in the direction towards frame 20 as a result of the ongoing rotation of spindle 30 in the second rotating direction.

The linear movement of sleeve 50 also leads to a linear movement of recess 56 cut in the inner surface of sleeve 56 in a direction towards frame 20. As soon as recess 56 is lowered in its initial position facing recess 30d cut in spindle 30, clamping claw actuator 162 flips back in its released position. The released position of clamping claw actuator 162 is such that the closed end of the one-side-closed cylinder of clamping claw actuator 162 is located in recess 56 of sleeve 50. The process of flipping back operates such, that the one-side-closed cylinder of clamping claw actuator 162 slides with its chamfer 162a along chamfer 156a of recess 56 till clamping claw actuator 162 reaches its released position as shown in FIG. 4.

The closed end of the one-side-closed cylinder that represents clamping claw actuator 162 is adapted to be located in recess 56 of sleeve 50. As soon as the closed end of clamping claw actuator 162 is flipped back in its released position, reinforcing spring 166 is no longer pressurized against clamping claw 162, so no force is pushing clamping claw 162 against threaded rod 42. Additionally, releasing spring 168 is leant against collar 170 of clamping claw 162 and pushes clamping claw 162 to undergo a radial movement in the radial direction towards sleeve 50 out of the engagement with threaded rod 42.

As a result, fixing element 40 can be removed from through-hole 32 of spindle 30. In the following, the tyre/rim wheel combination or rim R, respectively, can be lifted away from turntable 58. The inventive wheel-clamping device 100 reaches released state again as shown in FIG. 4.

LIST OF REFERENCES

10 Wheel-clamping device
R rim of a wheel
20 frame
22 through opening
30 spindle
30a driving-side end
30b mounting-side end
30c outer surface portion
30d recess
32 through hole
34 external thread-portion
40 Fixing element
42 threaded rod
44 centering cone
44a 1$^{st}$ end of cone
44b 2$^{nd}$ end of cone
50 sleeve
50a upper end of sleeve
50b lower end of sleeve
52 internal thread-portion
54 threaded coupling
56 recess
58 turntable
60 clamping means
62 clamping claw actuator
64 clamping claw
64a lower end of clamping claw
64b upper end of clamping claw
64c threaded surface of lower end of clamping claw
66 spring
70 stopping/holding means
72 clutch pack
72a 1$^{st}$ clutch
72b 2$^{nd}$ clutch
74 holder
76 pivoting arm
76a holder-side end of pivoting arm
76b frame-side end of pivoting arm
100 wheel-clamping device
X common middle axis
156a chamfer of recess
160 clamping means
162 clamping claw actuator
162a chamfer
164 clamping claw
166 reinforcing spring
168 releasing spring
170 collar
180 stopping/holding means
182 nut-profile
182a nut-segment
182b radial protrusion
182c unlocking-ramp
182d locking-ramp
184 cursor
184a tip of cursor
186 cursor casing
188 cursor spring
190 cylinder
190a cylinder connection means
192 piston
194 cylinder supply

The invention claimed is:

1. A wheel-clamping device for a wheel-service-machine, comprising:
a frame (20) with a through-opening (22),
a spindle (30) being rotatably supported in the through-opening (22) of the frame (20), wherein the spindle (30) has a mounting-side end (30b) being provided with an opening, and a driving-side end (30a), wherein the spindle (30) is connectable at its driving side end (30a) to a drive means provided for a rotary movement of the spindle (30), and wherein the spindle (30) has an external thread (34) on an external circumferential portion,
a sleeve (50) having a turntable (58) for the wheel to be temporarily clamped, wherein the sleeve (50) has an internal thread-portion (52), which is in threaded engagement with the external thread-portion (34) of the spindle (30),
stopping/holding means (70, 180) for at least temporarily rotationally holding of the sleeve (50) such that, when the sleeve (50) is temporarily rotationally hold by the stopping/holding means (70, 180), it moves in a direction along a center axis of the threaded engagement, and
clamping means (60, 160) for temporarily fixing a fixing element (40) to the spindle (30), wherein the fixing element (40) is inserted into the mounting-side opening of the spindle (30).

2. The wheel-clamping device as claimed in claim 1, wherein the stopping/holding means (180) comprises a nut-profile (182) having an unlocking-ramp (182c) and a locking-ramp (182d).

3. The wheel-clamping device as claimed in claim 1, wherein at least one cursor (184) is adapted to engage a nut-profile (182) of the stopping/holding means (180), and wherein the cursor (184) is rotationally fixed.

4. The wheel-clamping device as claimed in claim 1, wherein the stopping/holding means (70) comprise at least one clutch pack (72).

5. The wheel-clamping device as claimed in one of claim 1, wherein the stopping/holding means (70, 180) applies a first amount of frictional forces onto the sleeve (50) while rotating in a first rotating direction, wherein the stopping/holding means (70, 180) applies a second amount of frictional forces onto the sleeve (50) while rotating in a second rotating direction, and wherein the second amount of frictional forces is greater than the first amount of frictional forces.

6. The wheel-clamping device as claimed in claim 1, wherein the sleeve (50) is connectable to the frame (20) via the stopping/holding means (70, 180), and wherein the stopping/holding means (70, 180) is adapted to be actuated by an actuator means.

7. The wheel-clamping device as claimed in claim 1, wherein the clamping means (60, 160) is adapted to be actuated by a movement of the sleeve (50).

8. The wheel-clamping device as claimed in claim 1, wherein the clamping means (60, 160) comprises at least one clamping claw (64, 164) and at least one clamping claw actuator (62, 162).

9. The wheel-clamping device as claimed in claim 1,
wherein the spindle (30) provides at least one spindle recess (30d) extending in at least an axial direction of the spindle (30) to house the clamping means (60, 160).

10. A method for reversibly clamping a wheel on a wheel-clamping device for a wheel-service-machine as claimed in claim 1,
wherein a rotation of the spindle (30) in a first rotating direction moves the sleeve (50), which is temporarily rotationally held by the stopping/holding means (70, 180), in a direction along the center axis of the threaded engagement towards the wheel, thereby the clamping means (60, 160) is actuated to reversibly fix the rim (R) by the fixing element (40),
and wherein a rotation of the spindle (30) in a second rotating direction moves the sleeve (50), which is temporarily rotationally held by the stopping/holding means (70, 180), in a direction along the center axis of the threaded engagement away from the wheel, thereby the clamping means (60, 160) is actuated to let loose of the rim (R) by the fixing element (40).

11. The method as claimed in claim 10,
wherein the stopping/holding means (70, 180) applies a first amount of frictional forces onto the sleeve (50) while rotating in a first rotating direction, wherein the stopping/holding means (70, 180) applies a second amount of frictional forces onto the sleeve (50) while rotating in a second rotating direction, and wherein the second amount of frictional forces is greater than the first amount of frictional forces.

12. The method as claimed in claim 10,
wherein the clamping means (60, 160) is adapted to be actuated by the movement of the sleeve (50).

13. The method as claimed in claim 10,
wherein the clamping means (60, 160) comprise at least one clamping claw (64, 164) and at least one clamping claw actuator (62, 162), and wherein the sleeve (50) acts on the at least one clamping claw actuator (62, 162).

14. The method as claimed in claim 13,
wherein the at least one clamping claw actuator (62, 162), being actuated by the movement of the sleeve (50), actuates the at least one clamping claw (64, 164) to clamp the fixing element (40).

15. The method as claimed in claim 13,
wherein the at least one clamping claw (64, 164) is adapted to be spring loaded by a spring (66, 166), and wherein the at least one clamping claw (64, 164) tends to engage a threaded rod (42) being part of the fixing element (40), as a result of the spring load.

* * * * *